Patented Aug. 26, 1924.

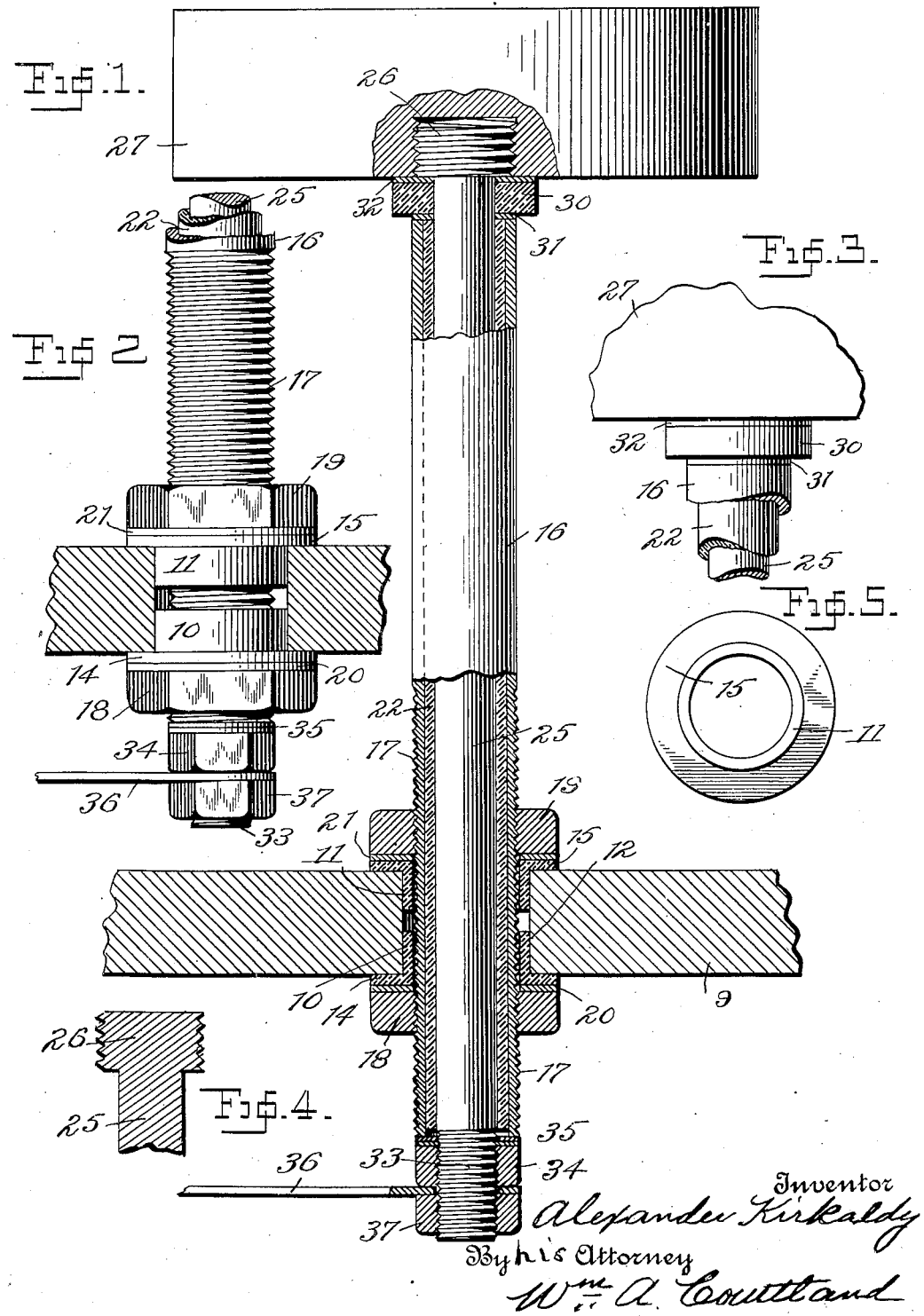

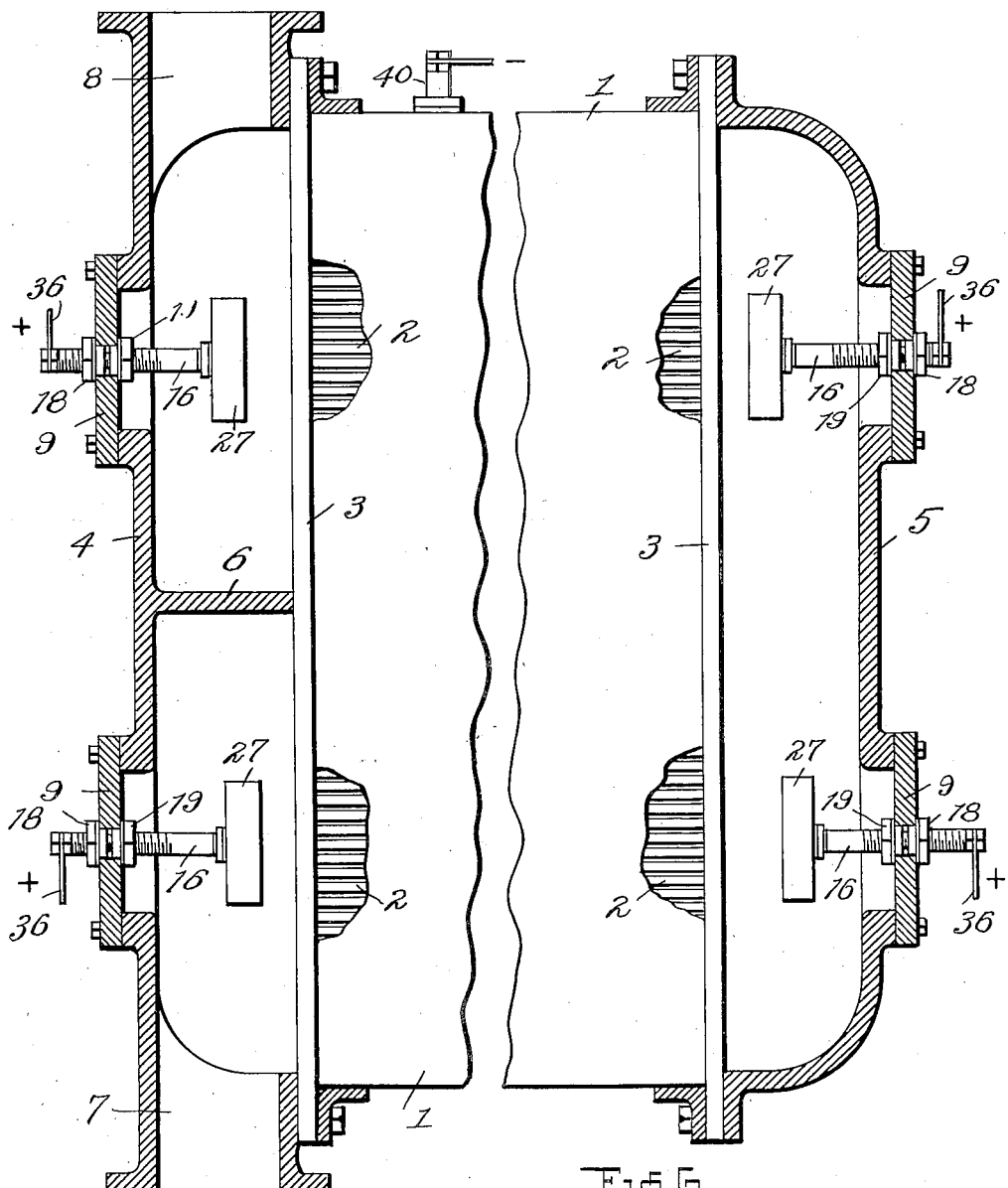
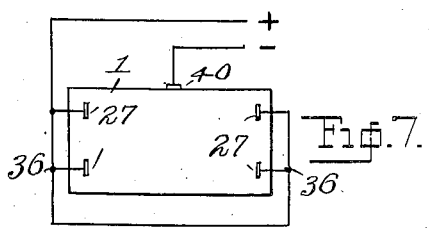

1,506,307

UNITED STATES PATENT OFFICE.

ALEXANDER KIRKALDY, OF BROOKLYN, NEW YORK, ASSIGNOR TO KIRKALDY ENGINEERING CORPORATION, OF NEW YORK, N. Y., A CORPORATION OF NEW YORK.

ELECTRODE.

Application filed October 30, 1923. Serial No. 671,753.

*To all whom it may concern:*

Be it known that I, ALEXANDER KIRKALDY, a citizen of the United States, residing in Brooklyn, borough of Kings, State of New York, have invented certain new and useful Improvements in Electrodes, of which the following is a specification.

This invention relates in general to an electrolytic system for the protection of condensers, boilers and the like and more particularly to the means for supporting and retaining electrodes in active position.

The primary object of the invention is to construct an electrode that can be adjusted within a condenser to change the position of the anode with relation to the parts to be protected.

Another object of the invention is to so construct and arrange the several members that the conductor member connecting the anode with the positive terminal, will, at all times and in all adjusted positions, be insulated from the condenser shell and the liquid within the condenser.

Other and further objects, including certain features of construction and application will appear in the specification and be pointed out in the appended claims, reference being had to the accompanying drawings which show the preferred embodiment of my invention.

Heretofore, electrodes used for this purpose were made in definite lengths so that the anode always maintained a fixed relation to the condenser tubes or the parts to be protected, and such relative position could not be changed after an electrode had been installed.

In an electrolytic system of this kind it is essential that the member conducting the current from the positive terminal outside the condenser shell to the anode be insulated both from the condenser shell and the liquid therein. Many of the insulating substances now used such as porcelain or any of the standard insulating materials, all of which are directly exposed to the heat and water of the condenser, have proven mechanically unsuitable for the purpose; porcelain because of its tendency to fracture under compression or by vibration and the standard insulations because of their tendency to swell, absorb water, split and become distorted. In the present invention the conductor member and the insulation covering the conductor member are completely encased within a metallic tube and said parts united to form a single unit capable of selective adjustment within a condenser.

In the accompanying drawings:

Figure 1 is a sectional view of an anode and its supporting members attached to the shell of a condenser.

Figure 2 is a detail view showing how the anode supporting members are adjusted.

Figure 3 is a detail in elevation of the supporting parts adjacent the anode.

Figure 4 is a detail view of the end of the conductor bar to which the anode is fastened.

Figure 5 is a detail view of one of the flanged insulating bushings which fits into the opening through the condenser.

Figure 6 is a vertical sectional view showing how the anodes are placed within the condenser.

Figure 7 is a diagrammatic view showing how the anodes are electrically connected.

Referring to Figure 1 of the drawings, 1 is the shell of a condenser of standard construction, 2 the tubes therein, 3 the tube supporting plates, 4 and 5 the front and rear removable heads, 6 the baffle plate which divides the front chamber, 7 the inlet pipe for the injection water, 8 the discharge for the injection water and 9 the sight hole doors in the front and rear heads. The condenser is also fitted with the usual inlet for steam and outlet for the water of condensation.

The anode supporting means, which is the essential part of the present invention, comprises two insulating bushings 10 and 11, which are placed within the opening 12 in the sight door 9 in a manner to allow the flanges 14 and 15 of said bushings to engage respectively the outer and inner walls of said sight door. Passing through these bushings is a metal pipe 16 which is threaded for some distance, as shown at 17, and carries thereon two nuts 18 and 19 one on each side of the sight hole door. On this pipe 16, between the bushings 14 and 15 and the nuts 18 and 19, are packing washers 20 and 21 which serve to make a perfectly tight joint between the pipe 16 and the sight hole door. Fitting within the pipe 16 and extending from end to end thereof is an insulating tube 22 of any material suitable for the purpose. Passing entirely through this insulating tube is the current conducting and anode supporting bolt 25 of any desired metallic material, the end within the condenser having a threaded head 26 thereon to engage the anode 27 which is axially bored and tapped to receive said conductor bar head.

The material of the anode 27 may be of any suitable kind and form but use of iron is preferred because of its efficiency and economy. In the drawings I have shown the anode in the form of a disk of proportions best suited to produce the desired results.

Located on the bar 25 between the inner end of the pipe 16 and the anode is a collar 30, preferably greater in diameter than the pipe 16 and of any suitable insulating material. Also on this bar 25 between the insulating collar and the pipe 16, and between the insulating collar and the anode are packing washers 31 and 32 which prevent the water from reaching the bar 25 when the anode is screwed tightly into position on said bar.

The outer end of the bar 25 is threaded, as shown at 33, and carries thereon a nut 34. This nut engages packing washers 35 located on the bar and against the pipe 16 and serves to make a tight joint when the pipe 16, insulating tube 22 and bar 25 are assembled in the manner shown in the Figure 1.

The bar 25 also has fastened on its outer end the positive terminal connector 36 which is held in position against the nut 34 by a nut 37.

In assembling the anode supporting parts the washer 32, insulating collar 30 and washer 31 are placed against the head 26 of the bar 25 in the order named. The tube of insulation 22 is then inserted in the metal pipe 16 and the conductor bar 25 pushed through the tube until the washer 31 engages the end of pipe 16, after which washers 35 are placed in position and nut 34 tightened until the head 26 of bar 25, is drawn forward with sufficient pressure to firmly assemble washers 31 and 32 and insulating collar 30 against the pipe 16 to insure a water tight joint at the inner end of said pipe 16. When these parts are united in the manner just described they form a single unit for supporting the anode in desired position. The anode 27 when screwed into position on the head 26 of bar 25, will engage washer 32 with sufficient pressure to prevent water reaching said bar, as shown in Figure 1. When the anode support is ready to be secured to the sight hole door 9, nut 19, packing washer 15 and insulating bushing 11 are placed on pipe 16 so that they will be within the condenser head, as shown in Figures 1 and 2. Pipe 16 is then thrust through the opening 12 in the sight hole door and insulating bushing 10, packing washer 20 and nut 18 placed in position on said pipe. By tightening nut 18 the parts will be drawn firmly together against the walls of the sight hole door and the anode support rigidly held in the position shown in Figure 1.

Adjusting the position of the anode with relation to the parts to be protected, which is the essential feature of the present invention, is accomplished by shifting the nuts 18 and 19 on the threaded pipe 16 until the anode is in the desired relation to said parts to be protected and then tightening nut 18 to retain said anode in the position selected. Figure 2 shows the anode supporting parts shifted to extreme inward position, that is so that the anode will be in its closest relation to the condenser tubes.

Thus it will be seen that variations in the adjustment of the anode are quickly and readily made to obtain an efficient distribution of the electrolytic effect over the whole of the surfaces to be protected.

In an electrolytical system for the protection of condensers, a positive, low tension, direct current of small amperage and voltage is supplied from a suitable source and directly connected to the iron anodes, which are submerged in the condenser circulating water. Figure 7 shows how these anodes are connected with the positive side of a suitable source of electrical energy while the condenser shell is connected to the negative side of the electrical source of energy, as shown at 40, but in view of the fact that the electrical equipment forms no part of the present invention it is not deemed necessary to show more than is set forth in the drawings.

Figure 6 shows a plurality of anodes placed within a condenser of standard construction in assumed positions, that is positions where observation has determined the electrolytic action will meet the prevailing requirements of this particular condenser. It will be noticed that each anode bears a different relation to the parts to be protected, thereby permiting a greater or lesser distribution of electrical energy to such parts and equalizing the electrolytic action on all parts within the condenser.

It should be understood that a number of condensers even though of the same make and capacity, and equipped with the electrolytic system would not have the same conditions prevail in electrolytic action owing to the fact that corrosion will be most pronounced on the weaker surfaces, and it is by observation only that such conditions can be determined and adjustments of the anodes made to meet the desired conditions.

It is a well known fact that when a plurality of anodes are used in a condenser, the relative action between each anode and the parts to be protected will vary to such an extent, due to the prevailing conditions of the electrolyte within the condenser, that in order to produce a fairly uniform action between said anodes and the parts to be protected, it has been found necessary to use a separate circuit to each anode and place within each of said circuits adjustable resistances or other means to control the supply of current to said anodes. To overcome this and other undesirable features in the present systems of this kind and for the purpose of maintaining, on all parts to be protected, a constant electrolytical reaction as required to meet the variations in the chemical resistance of the electrolyte and the anodes, the anodes are made adjustable with relation to the parts to be protected. By having the anodes adjustable the electrolytic effect produced upon the water can be regulated and maintained so as to continuously destroy the corrosive and scale forming properties with the maximum of efficiency. The anodes vary in the amount of current required, depending upon electrolytic action, it is therefore deemed desirable to have a single variable and controllable circuit connecting all anodes in order to make it possible to supply the exact amount of current required to meet the prevailing conditions in each condenser. With a selective adjustment of the anodes within the condenser and with a definite regulation of current to all anodes, said anodes are made to properly perform their required functions.

While I have shown the electrode as applied to a particular form of condenser, it should be understood that the same is capable of being applied to any form of condenser, boiler, tank or the like, and while I have shown and described the preferred embodiment of my invention obviously modification may be made within the spirit of the appended claims.

I claim:

1. In an electrolytic system of the character described, a metallic water containing casing, an electrode projecting within and insulated from said casing capable of being adjusted to vary the extent of its projection within said casing.

2. In an electrolytic system, a condenser, an electrode supporting means projecting within and insulated from a condenser and the water therein, an electrode carried by said supporting means, and said supporting means capable of being adjusted to vary the position of the electrode within the condenser.

3. In an electrolytic system of the character described, a metallic water containing casing, means projecting within and insulated from said casing and the water therein, an anode carried on said projecting means, and said projecting means capable of being adjusted to vary the position of the anode within the casing.

4. In an electrolytic system of the character described, a metallic water containing casing, an electrode supporting means projecting within and insulated from said casing and the water therein, an electrode carried by said supporting means and members carried on the supporting means capable of being adjusted to vary the position of the electrode within the casing.

5. In an electrolytic system of the character described, a condenser, an electrode projecting within and insulated from said condenser, and means movable on said electrode capable of being adjusted to permit said electrode to vary its position within the condenser and lock said electrode in adjusted position by engaging the head of the condenser.

6. In an electrolytic system of the character described, a condenser, an electrode projecting within and insulated from the condenser, and means movable on said electrode capable of being adjusted to permit said electrode to vary its position within the condenser, and adapted to engage the condenser head to lock said electrode in adjusted position.

7. In an electrolytic system, a condenser, an electrode supporting means projecting through the condenser head and into the condenser and insulated from said condenser and the water therein, an electrode attached to said supporting means, and members carried on the supporting means adjustable to permit said electrode to vary its position within the condenser and adapted to engage the head of the condenser to lock said electrode supporting means in adjusted position.

8. In an electrolytic system, a condenser, an electrode supporting means projecting within the condenser, an electrode attached thereto, said supporting means capable of being adjusted to vary the position of the electrode within the condenser, and a current conducting member within the electrode supporting means that is insulated from the condenser and the water therein in all adjusted positions of said electrode supporting means.

9. In an electrolytic system for the protection of condensers and the like a condenser, a current conducting member, an anode attached thereto, means for insulating said current conducting member from the condenser shell and the water within said condenser, and means supporting the current conducting member capable of being adjusted to vary the operative position of the anode within the condenser.

10. In an electrolytic system for condensers, a condenser an anode supporting means projecting within the condenser, comprising an anode supporting bar of conductive material, a shell of insulation covering said bar, a metal tube for holding said insulated bar, means at each end of said tube for uniting said bar, insulating shell and tube as a unit, an anode attached to the end of said bar, and means on the tube for adjusting said tube to vary the position of the anode within the condenser.

ALEXANDER KIRKALDY.